UNITED STATES PATENT OFFICE.

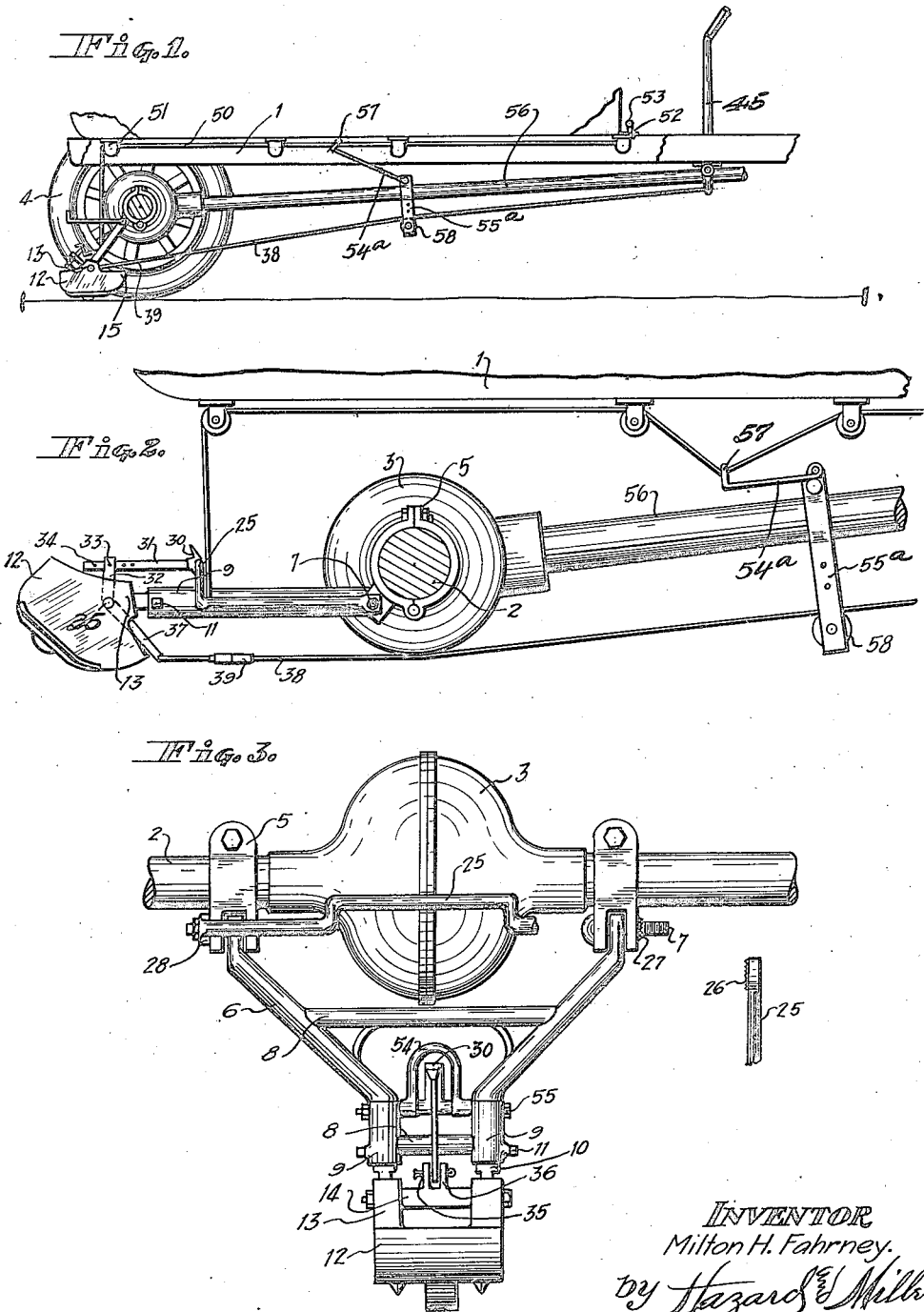

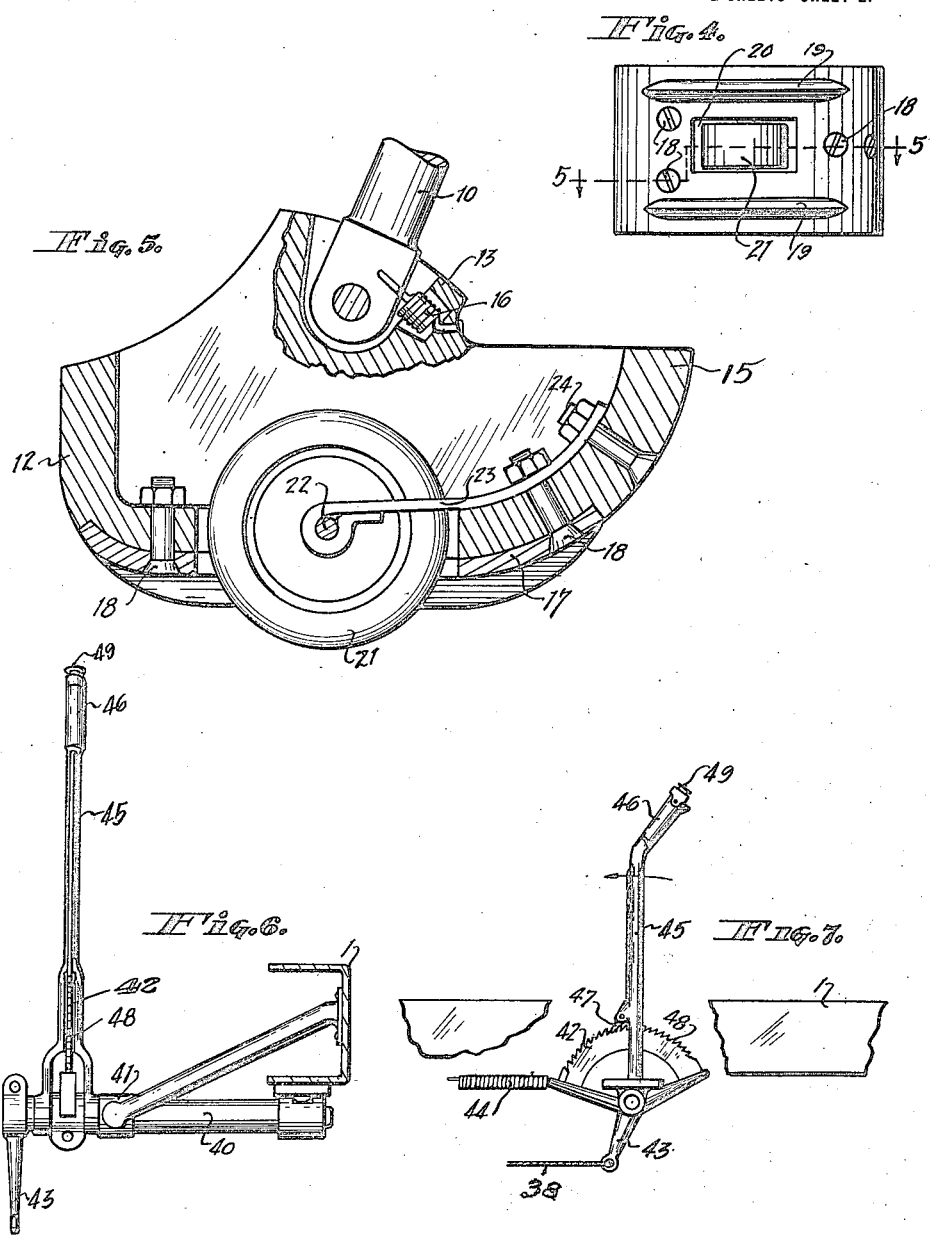

MILTON H. FAHRNEY, OF HOLLYWOOD, CALIFORNIA.

ANTISKID BRAKE.

Application filed November 11, 1920. Serial No. 423,310.

*To all whom it may concern:*

Be it known that I, MILTON H. FAHRNEY, a citizen of the United States, residing at Hollywood, in the county of Los Angeles and State of California, have invented new and useful Improvements in Antiskid Brakes, of which the following is a specification.

This invention is a braking device for motor vehicles and the like, which is arranged to prevent skidding when the brakes are applied, and has for its object the provision of a shoe normally in inoperative position out of engagement with the ground and arranged to be readily lowered so as to engage the ground and thus form an antiskid brake for the vehicle.

The invention will be readily understood from the following description of the accompanying drawings, in which:

Figure 1 is a side elevation showing a part of the frame of an automobile with the antiskidding device in operative position.

Fig. 2 is a fragmentary side elevation showing the device in inoperative position.

Fig. 3 is a rear view of the same with the device in operative position.

Fig. 4 is a bottom plan view of the antiskidding device.

Fig. 5 is a detail section through the same on the line 5—5 of Fig. 4.

Fig. 6 is a rear view of the operating lever for the device.

Fig. 7 is a side elevation of the same.

In the drawings I have shown the frame of the motor vehicle at 1, said frame supporting the rear axle housing 2 and differential housing 3 with the wheels 4 carried by the rear axle. The antiskidding device is mounted between the rear wheels and is suspended from the rear axle housing.

As an instance of this arrangement clips 5 may be detachably mounted upon the rear axle housing at the respective ends of the differential housing 3. The arms 6 of a clevis are pivoted to the respective clips as by bolts 7. The arms of the clevis may be braced as shown at 8 and the swinging ends of these arms extend alongside of one another and are arranged as tubes 9 in which rods 10 telescope. The rods 10 may be fixed in adjusted telescoped position by means of said screws 11.

The ground engaging shoe of the antiskidding device is shown at 12 provided with upwardly projecting transversely spaced lugs 13. A rock rod 14 is journaled in the lugs 13 and the rods 10 are journaled upon this rock rod, as clearly shown in Fig. 5.

A toe 15 is provided at the front of the shoe 12 and springs 16 are arranged with their ends fixed to rods 10 and to the shoe 12 so as to normally swing the shoe into the position shown in Fig. 5, where the lower surface of the shoe is substantially parallel to the ground and the toe 15 curves upwardly therefrom.

The base of the shoe comprises plate 17 which is readily removable and replaceable by means of the bolts 18. This plate is, preferably, provided with depending ribs 19 extending from front to rear of plate 17, and a slot 20 is, preferably, provided in the plate between the ribs. A wheel 21 is journaled upon a shaft 22 within shoe 12 so that the periphery thereof projects through the slot 20 into position to first engage the ground when the shoe is lowered. This wheel is so mounted as to readily yield into retracted position within shoe 12 so that the ribs 19 of plate 17 may readily engage the ground. For this purpose the shaft 22 is supported by the free end of a spring 23 which is fixed at its opposite end to the shoe 12 as by a bolt 24.

The antiskid shoe is normally retained in inoperative position as shown in Fig. 2, and the clevis supporting the same is swung upon the pivots provided by bolt 7 when it is desired to lower the shoe to the ground engaging position shown in Fig. 1. The mechanism for swinging the clevis includes a retaining rod 25 which may be adjustably supported by the pivot bolts 7. For this purpose the central portion of the retaining rod projects rearwardly from the axle housing 2 so as to be engaged by a clip 30 carried by the antiskid shoe when the latter is lowered. The ends of the retaining rod are angularly disposed and are supported by the respective bolts 7. For this purpose the ends of the rod are received over the bolts 7 and are provided with corrugated surfaces 26 co-operating with corrugated surfaces 27 upon the clips 5, so that when the nuts 28 which are received upon the bolts 7 are tightened, the ends of the rod 25 will be clamped in pivotally adjusted positions with relation to the clips 5. The central portion of the retaining rod adapted to be engaged by the clip 30 carried by the antiskid shoe may thus be vertically adjusted to bring the retaining rod into proper position to be engaged by the clip 30.

The clip 30 is carried by a clip carrying arm 31 which is, preferably, longitudinally adjustable with relation to one arm 32 of a bell crank lever as by having a bolt 33 supported by the arm 32 of the bell crank lever received through any one of a series of openings 34 provided in the clip carrying arm 31. The bell crank lever is pivoted as shown at 35 to lugs 36 projecting upwardly from rock rod 14. The outer end of the bell crank lever shown at 37 is connected to an actuating cable 38 which is provided with suitable means shown at 39 for adjusting the length of said cable.

When the antiskid shoe is in inoperative position the clip 30 is engaged by the retaining rod 25 so as to prevent downward swing of the shoe, and when the bell crank lever is rocked through pull exerted upon the cable 38, the clip 30 is withdrawn from retaining rod 25 so as to permit the antiskid shoe to swing downwardly to the position shown in Fig. 1. With the parts in the position shown in Fig. 1 additional pull upon the cable 38 will swing the clevis supporting the antiskid shoe more nearly into a vertical position, and the engagement of the antiskid shoe with the ground will tend to raise the wheels 4 from the ground. This engagement of the antiskid shoe with the ground will positively prevent side slipping of the motor vehicle and the skidding of the tires of the wheels 4.

The cable 38 extends forwardly and is actuated by mechanism arranged convenient to the driver of the motor vehicle. For this purpose a shaft 40 may extend laterally from the frame 1 adjacent the driver's seat, said shaft being journaled in a bearing 41. The shaft is provided with an arcuate plate 42 and with a crank arm 43 to which the cable 38 is connected. A spring 44 is interposed between the frame of the vehicle and the arcuate plate 42 so as to normally turn the shaft 40 to a position where no pull is exerted upon cable 38.

The mechanism for manually rotating shaft 40 against the action of spring 44 and thus pulling cable 38, may include a lever 45 journaled upon shaft 40 and provided at its free end with a handle 46. A pawl 47 is carried by lever 45 and is arranged to engage a ratchet 48 upon the arcuate plate 42. This pawl normally engages the ratchet and is adapted to be released by push rod 49 arranged convenient to handle 46. It will thus be seen that the lever 45 engaging the arcuate plate 42 through the pawl and ratchet connection will permit shaft 40 to be manually rotated so as to exert pull upon cable 38 for releasing the antiskid shoe. When the lever has been moved as far as possible by releasing the pawl and ratchet connection, a new grip upon the arcuate plate may be obtained by the lever for continuing the pull upon cable 38 so as to complete the movement of the antiskid shoe to its operative position.

Means are provided for returning the antiskid shoe to its inoperative position, and in the present invention I have shown such means as comprising a cable 50. This cable extends along the frame of the motor vehicle over suitable pulleys 51, and at its forward end projects through an opening 52 in the floor board of the motor vehicle so as to be readily grasped by the driver of the machine. For this purpose a handle 53 may be provided upon the end of the cable. The opposite end of the cable extends downwardly above the clevis carrying the antiskid shoe, and at its end is connected to a loop 54 which, preferably, is pivoted upon a transverse rod 55 received between the two portions 9 of the clevis arms 6. By this arrangement it will be seen that the clevis carrying the antiskid shoe may be readily swung back up to its inoperative position so that the clip 30 will engage the retaining rod 25 by simply pulling upon the handle connected to cable 50.

A tensioning device is, preferably, provided for cable 50 in order to take up the slack in the cable and thus prevent rattling or undue vibration of the parts forming the antiskid device. For this purpose a spring $54^a$ is fixed at one end upon a clamp $55^a$ which may be received around a part of the motor vehicle shown as the main shaft housing 56. The opposite end of the spring forms hook 57 adapted to be received over cable 50 between two of its supporting pulleys, and the spring is of such tension as to draw down upon the cable for taking up the slack therein. The clamp $55^a$ may also be utilized to support a pulley 58 forming a guide for the cable 38.

Various changes may be made without departing from the spirit of the invention as claimed.

What is claimed is:

1. The combination with a vehicle, of an antiskid device including a pivoted support and a shoe carried thereby, a retaining rod for the antiskid device, a clip carried by the latter and adapted to engage the retaining rod, and means for adjusting the retaining rod relative to said clip.

2. The combination with a vehicle, of an antiskid device having releasable means for retaining the same in inoperative position, a flexible connection for returning the antiskid device to inoperative position after release thereof, and means for tensioning said flexible connection.

3. The combination with a vehicle, of an antiskid device including a bracket, a support pivoted to the same, a shoe carried by said support, a clip on said shoe, a retaining rod connected to the bracket by the pivotal mounting for said support, so as to permit of adjustment of said retaining rod relative to said clip, said clip being adapted to releasably engage said retaining rod.

In testimony whereof I have signed my name to this specification.

MILTON H. FAHRNEY.